United States Patent
Francis et al.

[19]

[11] Patent Number: 6,036,500
[45] Date of Patent: Mar. 14, 2000

[54] ELECTRICAL CONNECTION SYSTEM FOR A SELECTABLY ADJUSTABLE RIDE STRUT

[75] Inventors: Michael Eugene Francis, Beaver Falls, Pa.; Kathleen D. Murphy, Girard, Ohio; Christopher Adrian Margrave; Gregory Larry Bensing, both of Cortland, Ohio; William Gilbert Strang, Warren, Ohio

[73] Assignee: General Motors Corporation, Detroit, Mich.

[21] Appl. No.: 09/118,174

[22] Filed: Jul. 17, 1998

[51] Int. Cl.[7] .................................................. H01R 33/00
[52] U.S. Cl. ............................................. 439/34; 439/352
[58] Field of Search ............................. 439/34, 312, 271, 439/352, 357, 358, 521

[56] References Cited

U.S. PATENT DOCUMENTS

| | | | |
|---|---|---|---|
| 4,789,343 | 12/1988 | Dougherty et al. | 439/34 |
| 5,669,763 | 9/1997 | Pryce et al. | 417/313 |

*Primary Examiner*—Khiem Nguyen
*Attorney, Agent, or Firm*—Patrick M Griffin

[57] ABSTRACT

An electrical connection system for interfacing with an end portion of a strut rod, wherein the electrical connection therebetween is sealed against environmental degradation and is unaffected by vehicular vibration, and wherein the electrical connection system is easily installed and easily serviced. A connector includes a connector shell having an upper end and an opposite lower end; an insert which carries a ground terminal and a power terminal within the connector shell; a lock ring which interfaces connectably with the connector shell to provide anchorage with the end portion of the strut rod; and seals at the upper and lower ends of the connector shell. The ground terminal connects with a ground cable and resiliently clips onto a smooth section of the end portion of the strut rod, wherein the strut rod serves as the ground conduit. The power terminal is connected with a power cable and abuts a pin axially resident in the strut rod. In order to assure proper seating of the terminals with respect to the strut rod, the lock ring is inhibited from rotating with respect to the connector shell unless it has been sufficiently placed over the strut rod. Connector position assurance (CPA) is provided by a CPA member which snappingly engages the connector shell and the lock ring only when they are correctly interfaced with each other and thereupon prevents rotation relative to each other.

19 Claims, 6 Drawing Sheets

ELECTRICAL CONNECTION SYSTEM FOR A SELECTABLY ADJUSTABLE RIDE STRUT

TECHNICAL FIELD

The present invention relates to adjustable ride struts, wherein an electrically actuated member within the strut changes ride characteristics of the strut responsive to electricity entering into the strut. More particularly, the present invention is an electrical connection system for electrically connecting a ride strut to a source of electricity, wherein the electrical connection is not subject to environmental degradation and is readily serviceable.

BACKGROUND OF THE INVENTION

Adjustable ride struts provide adaptability for a motor vehicle with respect to road and vehicular conditions. An example of an adjustable ride strut is a shock absorber having an internal solenoid which, depending upon electrical actuation of the solenoid, controls the operational characteristics of the shock absorber. In this regard, an axial bore is provided in the strut, wherein an electrically insulated pin is resident therein. An electrical terminal is used to connect the pin with the strut, wherein the strut serves as a ground path.

Electrical connection to a strut is difficult for a number of automotive related reasons. For example, environmental exposure will degrade exposed or inadequately sealed connections and vibration can loosen or disconnect connections. Hard wiring a strut connection is not a viable option, in that such a connection is not serviceable.

A known strut connector utilizes a three-way electrical connector which requires indexing, additional connector attachment features and routes all circuits through the axial bore of the strut rod. Connector alignment is a significant concern with regard to this strut connector, since bent pins are a common problem which can result in an unusable shock absorber.

Accordingly, what is needed is an electrical connection system for a strut rod which is sealed, unaffected by vibration, and easily serviced.

SUMMARY OF THE INVENTION

The present invention is an electrical connection system for interfacing with an end portion of a strut rod, wherein the electrical connection therebetween is sealed against environmental degradation and is unaffected by vehicular vibration, and wherein the electrical connection system is easily installed and easily serviced.

The connection system according to the present invention includes a connector and an interfacing end portion of a strut rod. The connector includes a connector shell having an upper end and an opposite lower end; an insert which carries a ground terminal and a power terminal within the connector shell; a lock ring which interfaces connectably with the connector shell to provide anchorage with the end portion of the strut rod; and seals at the upper and lower ends of the connector shell.

The connection system electrically connects the an end portion of a strut rod of a ride strut (ie., a shock absorber rod) to thereby provide electrical power to an electrical article (such as for example a solenoid or electrorheological fluid) within the ride strut to thereby change the ride characteristics of the vehicle equipped therewith. In this regard, the ground terminal is connected with a ground cable and resiliently clips onto a smooth section of the end portion of the strut rod, wherein the strut rod serves as the ground conduit. In this regard further, the power terminal is connected with a power cable and abuts a pin axially resident in the strut rod.

The connection system according to the present invention provides a sealed electrical connection that is impervious to environmental weathering. To this end, at an upper end of the connector shell, a cable seal sealingly interfaces with the power and ground cables and with the connector shell; while at the lower end of the connector shell, a connector seal sealingly interfaces with the smooth section of the end portion of the strut rod and with the connector shell.

The connector is anchored to the end portion of the strut rod by a pair of serrated metal legs which depend from the connector shell and which are selectively squeezed into an interfering fit with a threaded section of the end portion of the strut rod. Squeezing of the metal legs is provided by rotation of the lock ring relative to the connector shell via an oval shaped cross-section of the lock ring. In order to assure proper seating of the terminals with respect to the strut rod, the lock ring is inhibited from rotating with respect to the connector shell unless it has been sufficiently placed over the threaded section. Connector position assurance (CPA) is provided by a CPA member which snappingly engages the connector shell and the lock ring only when they are correctly interfaced with each other. The CPA member interferingly abuts the connector shell and the lock ring so that they cannot rotate relative to each other so long as the CPA member is engaged therewith.

Accordingly, it is an object of the present invention to provide an electrical connection system for connecting a strut rod to a source of electricity, wherein the connection system provides a connection which is environmentally sealed, vibration resistant, and serviceable.

It is an additional object of the present invention to provide an electrical connection system for connecting a strut rod to a source of electricity, wherein connector components thereof mechanically engage only if the connector is fully seated upon an end portion of the strut rod.

It is yet a further object of the present invention to provide an electrical connection system for connecting a strut rod to a source of electricity, wherein power and ground terminals thereof each contact corresponding electrical components of the strut rod, and wherein the contacts are sealed from the environment.

It is still another object of the present invention to provide an electrical connection system for connecting a strut rod to a source of electricity, wherein engaging components of a connector thereof are prevented from mutually disengaging by a connector position assurance (CPA) member.

It is yet another object of the present invention to provide an electrical connection system for connecting a strut rod to a source of electricity, wherein the contacts are sealed, yet the connector is easily serviceable.

It is still a further object of the present invention to provide an electrical connection system for connecting a strut rod to a source of electricity, wherein a wire dress feature locally supports, directs and protects power and ground cables associated therewith.

These, and additional objects, advantages, features and benefits of the present invention will become apparent from the following specification.

DESCRIPTION OF THE PREFERRED EMBODIMENT

Figure 1:
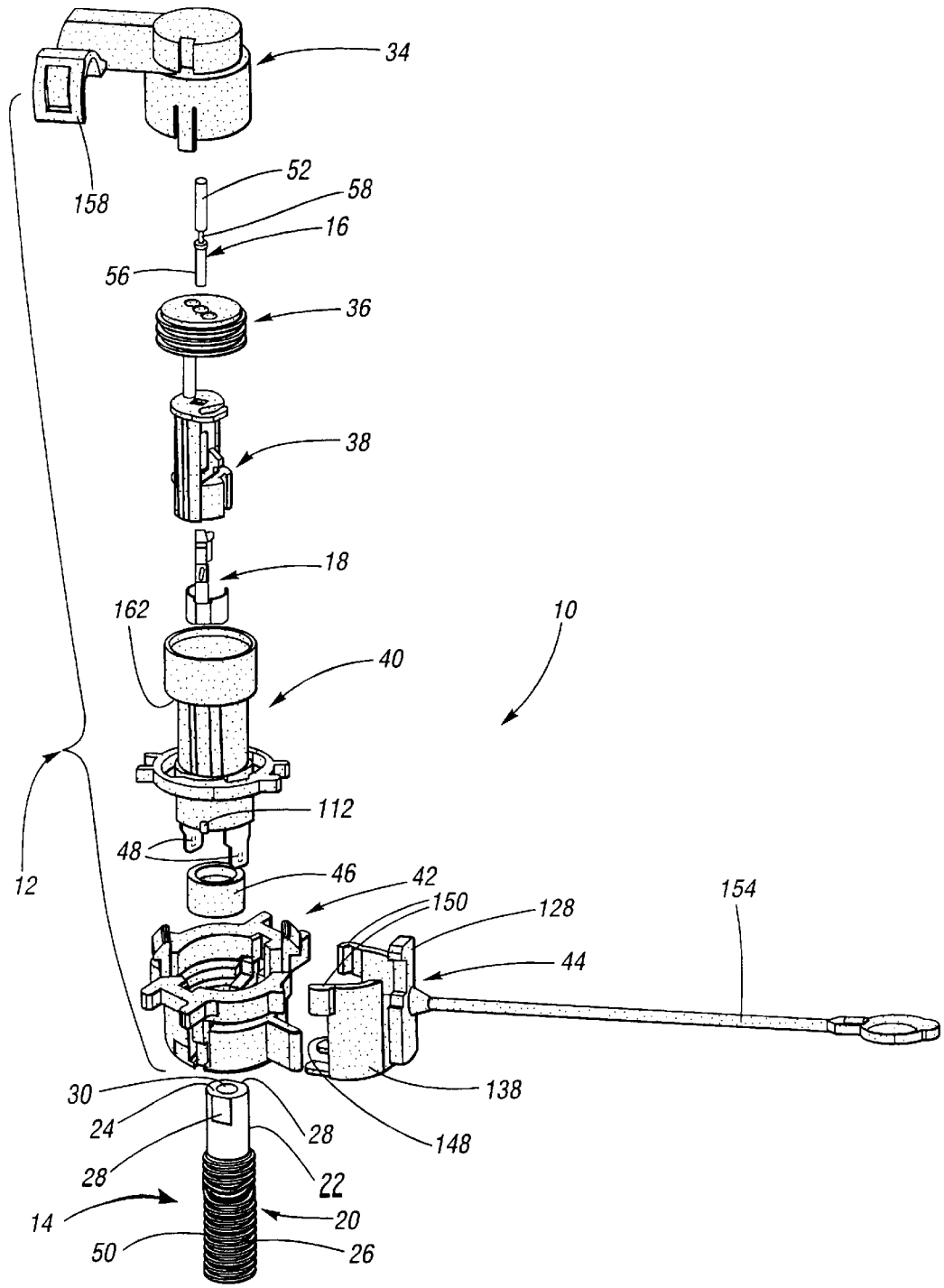
FIG. 1 is an exploded perspective view of the connection system according to the present invention.

Referring now to the Drawings, FIG. 1 generally depicts the connector system 10 according to the present invention, wherein a connector 12 interfaces with a strut rod 14 to thereby connect the strut rod to a source of electricity. The connector serves to electrically connect a power terminal 16 and a ground terminal 18 to an end portion 20 of the strut rod 14.

As shown at FIG. 1, the end portion 20 of the strut rod 14 has a smooth section 22 extending axially from the distal end 24 thereof, and further has a threaded section 26 adjoining the smooth section remote from the distal end. The end portion 20 has a cylindrical shape, wherein a pair of opposing flats 28 are located adjacent the distal end 26. An axial bore 30 is provided in the strut rod 14, wherein the axial bore carries a pin 32 having an insulating sheath 32a (see FIGS. 10 and 11), wherein a preferred pin has a diameter of about 1 mm. The pin 32 electrically connects with an electrically actuable member (not shown) for adjusting the ride characteristics of the strut associated with the strut rod 14, such as for example a solenoid or an electrorheological fluid. The strut rod 14 is composed of an electrically conductive metal which serves as the ground path for the electrical connection to the electrically actuable member.

As further shown at FIG. 1, the connector 12 includes a wire dress 34, the power terminal 16, an elastomeric cable seal 36, the ground terminal 18, a plastic insert 38 for supporting the power and ground terminals, a connector shell 40 which sealingly carries the insert, a lock ring 42 for rotatably interfacing with the connector shell to thereby secure the connector onto the end portion 20 of the strut rod 14, and a connector position assurance (CPA) member 44 for assuring correct connection between the lock ring and the connector shell.

The insert 38 fits into the connector shell 40, the power terminal 16 mates with the pin 32 and the ground terminal 18 mates with the smooth section 22. The connection system 10 provides environmental sealing of the electrical connections of the power and ground terminals, via the cable seal 36 at the upper end of the connector shell and an elastomeric connector seal 46 at the lower end of the connector shell which seals against the smooth section 22.

Mechanical attachment of the connector 12 to the strut rod 14 is achieved by rotating of the lock ring 42 relative to the connector shell 40 between an unlocked position (shown at FIG. 10) to a locked position (shown at FIG. 11) so that two serrated legs 48 of the connector shell 40 interferingly engage the threads 50 of the threaded section 26. The CPA member 44 engageably snaps onto both the connector shell 40 and the lock ring 42 when they are properly mated and prevents their untwisting under vibratory conditions, as well as affords a supplemental attachment at the threads 50.

The CPA member 44 and the lock ring 42 are disengageable so that the connection system 10 can be removed and replaced for servicing.

Figures 2, 12:
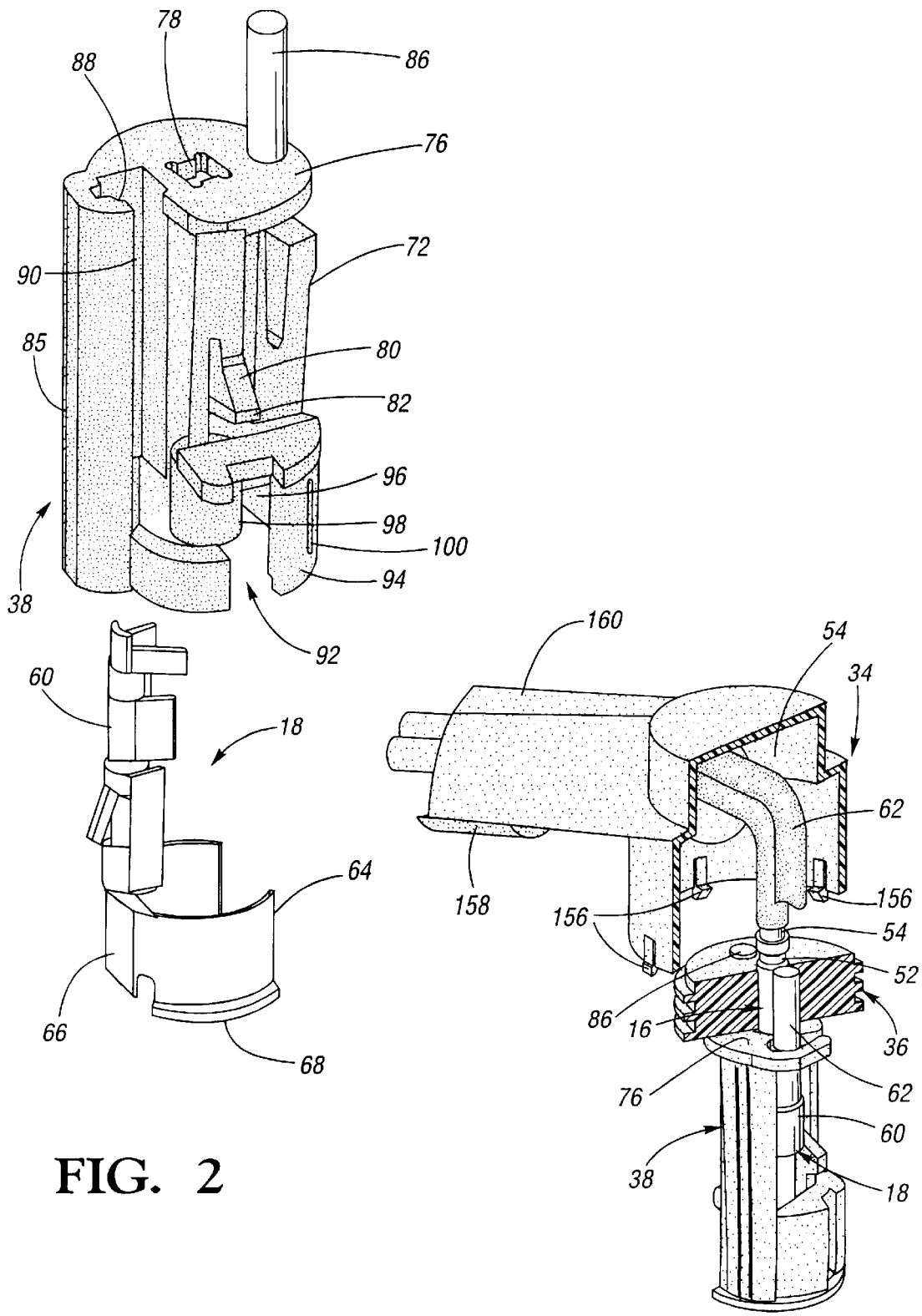
FIG. 2 is a perspective view depicting an insert and ground terminal according to the connection system shown in FIG. 1.
FIG. 12 is an exploded, perspective view of a portion of the connection system according to the present invention, showing in particular the wire dress thereof.

Referring now additionally to FIG. 2, the insert 38, power terminal 16 and ground terminal 18 will be detailed.

The power terminal 16 is a push-to-seat tubular terminal. A crimpable rear end portion 52 provides crimpable engagement to a power cable 54 (see FIG. 12). The forward end portion 56 receives a tip of the pin 32 (see FIGS. 10 and 11). A preferred power capability thereof is on the order of about 100 watts. A reduced cross-section 58 is located between the rear and forward end portions 52, 56.

The ground terminal 18 is of a pull-to-seat construction and has a mast end 60 which is crimped to a ground cable 62 (see FIG. 12). A spring clip end 64 of the ground terminal 18 is generally annular and includes a flat 66. The clip end 64 resiliently abuts the smooth section 22 of the strut rod 14 to electrically connect therewith, wherein the flat 66 abuts a flat 28 of the strut rod. To facilitate placement of the clip end 64 onto the strut rod 14 at the distal end 24 thereof, the clip end is preferably provided with a flair 68.

The insert 38 is a plastic piece which is structured to retain the power and ground terminals 16, 18 in a proper position for mating with the strut rod 14 as described hereinabove. The insert 38 seats within an interior hollow 70 (see FIG. 5) of the connector shell 40. The insert 38 is locked in place relative to the connector shell 40 via a primary lock arm 72 which interferingly engages an abutment 74 of the connector shell.

A cap 76 has a center opening 78 through which the power terminal 16 passes. Two resilient secondary lock arms 80 (one being visible in FIG. 2) interferingly engage the reduced cross-section 58 of the power terminal 16 to thereby secure the power terminal 16 to the insert 38. The secondary lock arms 80 have outwardly extending radial extensions 82 which pressably abut respective ribs 84 at the interior hollow 70 (see FIG. 3) to thereby provide reinforcement and improve retention of the power terminal 16 with respect to the insert 38. A post 86 extends axially upward from the cap 76, situated at one side of the opening 78. The post 86 serves to locate the cable seal 36 during assembly.

Adjacent an axial protuberance 85 of the insert 38, a ground terminal slot 88 is formed having an opening 90 axially along the insert 38, inclusive of the cap 76. The axial protuberance 85 is received into an axial indentation 87 formed at the interior hollow 70 of the connector shell 40 (see FIG. 4) which prevents the insert 38 from rotating relative to the connector shell. The opening 90 allows for the ground cable 62 to be routed through the insert 38 and then the ground terminal 18 is pulled into a seated position. Accordingly, the ground cable 62 may connected with the ground terminal 18 by automatic cutting/crimping equipment. At the open end 92 of the insert 38 (opposite the cap 76), there is a generally annular wall 94 having a flat 96 opposite the ground terminal slot 88. The flat 96 abuttingly engages a flat 28 of the strut rod 14 when the connector 12 is located thereon. In this regard, both the flat 96 of the insert 38 and the flat 66 of the ground terminal 18 abut respective flats 28 of the strut rod 14 to prevent relative rotation therebetween.

A plastic tower 98 extends downwardly and axially from the open end 92 of the insert 38. The tower 98 surrounds the power terminal 16 so as to electrically insulate it from the strut rod 14.

At the exterior surface of the wall 94 are crush ribs 100 which are structured to interact with the connector shell 40 by taking-up slack and manufacturing tolerances. Further, in that the clip end 64 of the ground terminal is fitted into the wall 94, the crush ribs 100 in association with the connector shell, help to support the ground terminal with respect to the insert.

Figure 3:
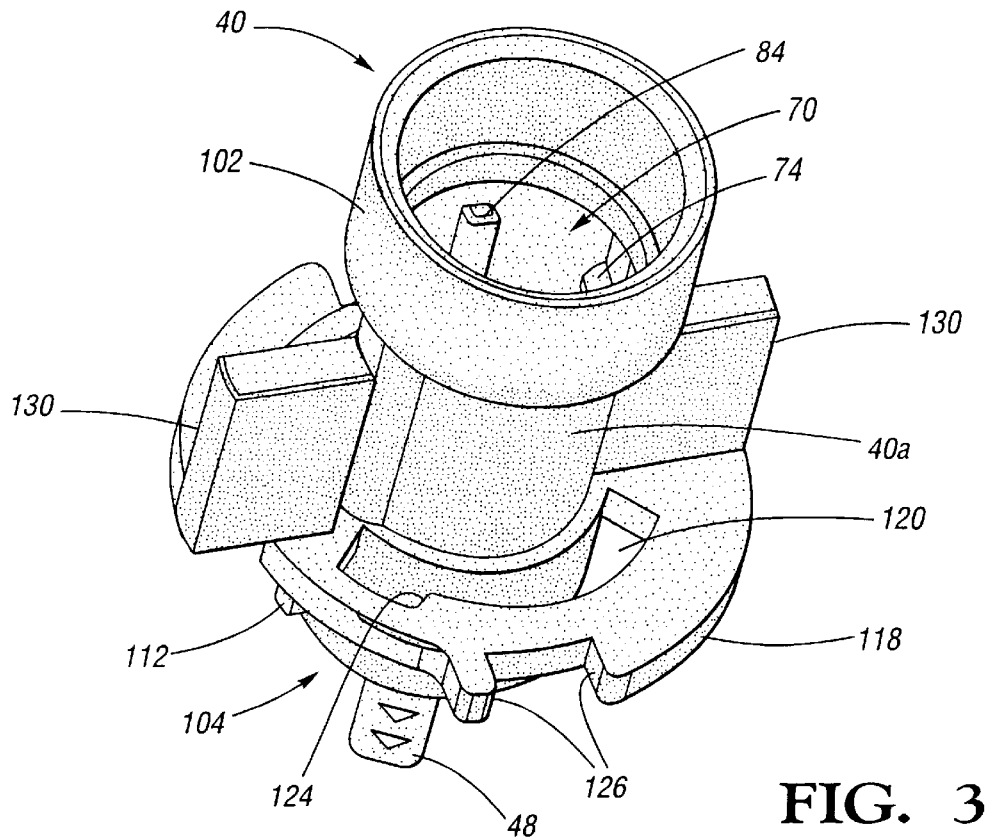
FIG. 3 is a perspective view of a connector shell according to the connection system shown in FIG. 1.
Figure 6:
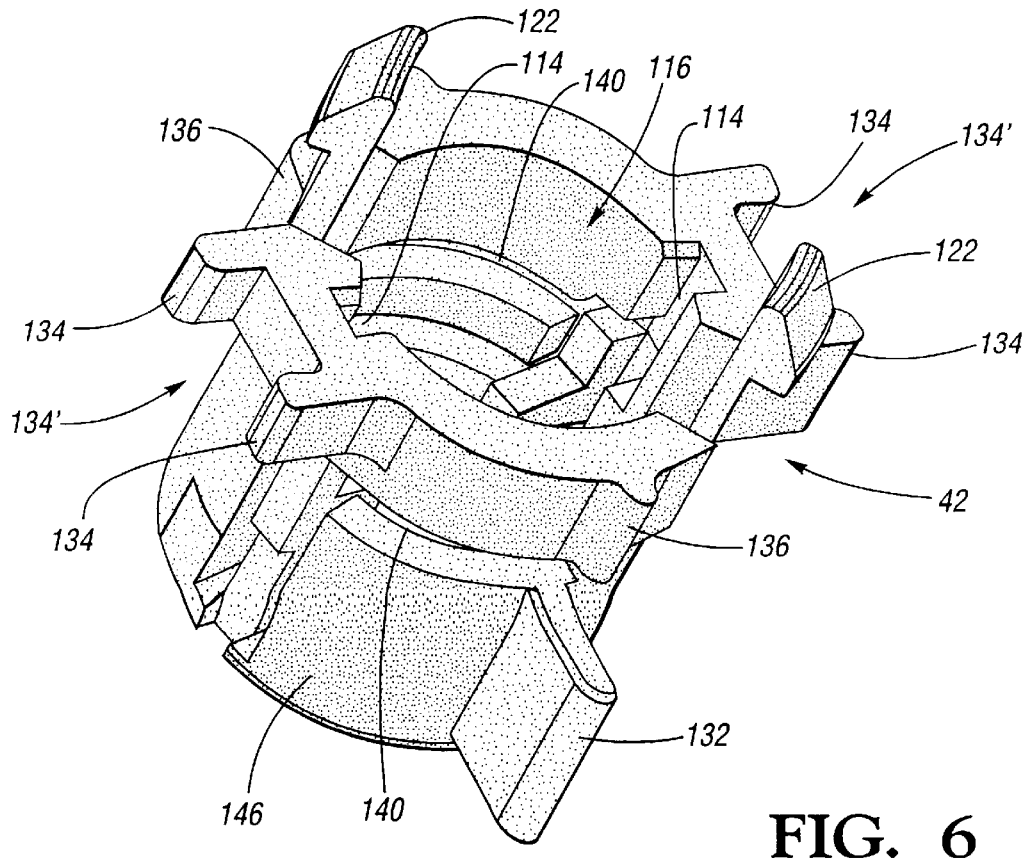
FIG. 6 is a perspective view of a lock ring according to the connection system shown in FIG. 1.
Figure 4:
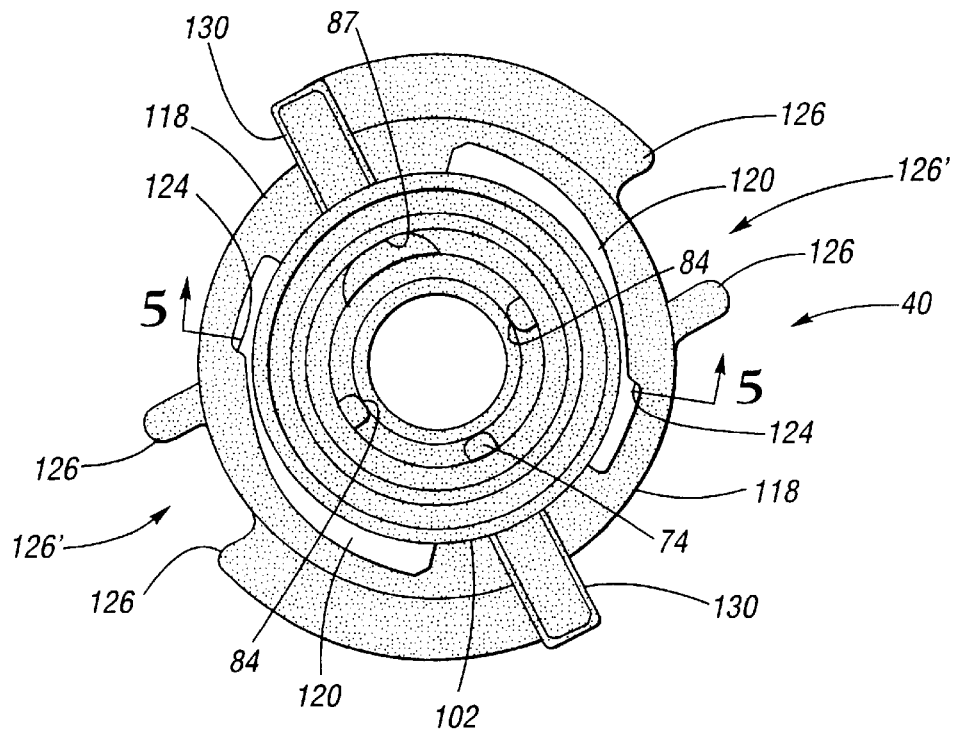
FIG. 4 is a top plan view of the connector shell shown at FIG. 3.
Figure 5:
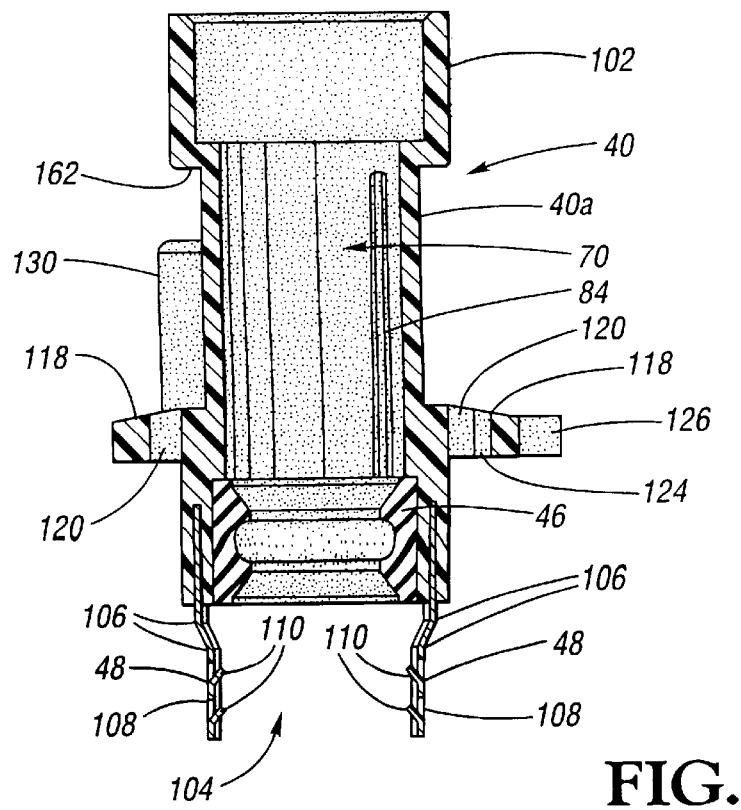
FIG. 5 is a cross-sectional view of the connector shell, taken along line 5—5 in FIG. 4.
Figure 7:
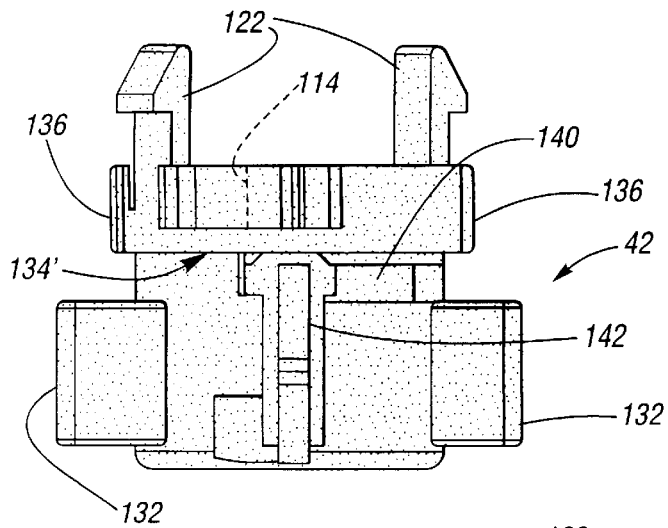
FIG. 7 is a side view of the lock ring shown at FIG. 6.

Referring now additionally to FIGS. 3 through 5, the connector shell 40 will be detailed.

As indicated hereinabove, the plastic body of the connector shell 40 houses the insert 38 with its associated power and ground terminals 16, 18; abuts the secondary lock arms 80 and the crush ribs 100; and provides a sealing interface with the cable and connector seals 36, 46. With regard to sealing, the cable connector 36 sealingly interfaces with an annular shell 102 at the upper end of the connector shell, while the connector seal 46 is over-molded at the lower end 104 thereof.

The aforementioned legs 48 are insert molded at the lower end 104 of the connector shell 40. Each leg is bent 106 so that the spacing between the anchor portions 108 place the anchor portions generally adjacent the strut rod 14 (see FIG. 10). The facing sides of the anchor portions 108 are provided with at least one serration 110 which is structured for interferingly interfacing with the threads 50 when the legs are caused to be squeezed thereagainst (see FIG. 11).

Two short bosses 112 located on opposite sides of the connector shell 40 adjacent the lower end 104. The bosses 112 serve two purposes. Firstly, they align to axial grooves 114 on the interior hollow 116 of the lock ring 42 to thereby ensure proper installation therebetween. And secondly, the bosses 112 prevent the lock ring 42 from rotating (twisting) to a locked position relative to the connector shell 40 unless the connector 12 is fully seated on the strut rod 14 whereby electrical contacts are operative.

A thin, external flange 118 extends radially outward from the body 40a of the connector shell 40 in spaced relation to the lower end 104. The annular flange 118 has mutually opposing lock slots 120 for receiving therein a pair of mutually opposing lock tabs 122 of the lock ring 42 for securing the lock ring to the connector shell 40. When in the locked position, the lock tabs 122 provide resistance against a ledge 124 of each of the lock slots 120 to thereby prevent unintentional reverse rotating (twisting) of the lock ring relative to the connector shell.

Extending radially outward from the annular flange 118 at each lock slot 120 is a pair of mutually spaced apart connector tabs 126. The connector tabs 126 of each connector tab pair 126' are mutually spaced just sufficiently to allow a pedestal 128 of the CPA member 44 to fit therebetween.

Finally, a pair of axial ears 130 are connected with the body 40a of the connector shell 40 about midway between the collar 102 and the lower end 104. The ears 130 are used for the fingers and thumb so that a user can grasp the connector shell 40 when the lock ring 42 is rotated in relation thereto.

Referring now additionally to FIGS. 6 through 9, the lock ring 42 will be detailed.

As indicated hereinabove, the lock ring 42 has two axially extending lock tabs 122 which interface with the lock slots 120. The lock ring 42 has ears 132 structured and operationally similar to the ears 130 of the connector shell 40. Further, the lock ring 42 has two pairs of lock ring tabs 134 which are mutually spaced apart and function as the connector tabs 126. Similarly, too, in this regard, the lock ring tabs 134 of each lock ring tab pair 134' are mutually spaced just sufficiently to allow the pedestal 128 of the CPA member 44 to fit therebetween. A pair of opposed embossments 136 are offset ninety degrees in relation to the lock ring tab pairs 134' and serve as a snapping interface for a bifurcated collar 138 of the CPA member 44.

The rotation of the lock ring 42 from the unlocked position to the locked position is defined by an interlock feature. As recounted hereinabove, the axial grooves 114 run axially at the interior hollow 116 of the lock ring 42, and these align with the bosses 112 of the connector shell 40, ensuring proper alignment during installation. Radial grooves 140 communicate with the of the axial grooves 114 and provide rotary paths for the bosses 112 to follow when the lock ring 42 is rotated (twisted) relative to the connector shell 40. However, the radial grooves 140 are selectively blocked by respective floating tabs 142, and when blocked the lock ring 42 is prevented from rotating relative to the connector shell 40 unless the connector 12 is fully seated on the strut rod 14. To provide this feature, the floating tabs 142 are provided with radially inward wings 144. The wings 144 are predetermined so that when they engage the smooth section 22 the radial grooves 140 are blocked, but when they engage the threaded section 26, the floating tabs 142 pivot radially outwardly so as to unobstruct the radial grooves at the axial grooves 114, whereupon the bosses 112 are freely able to travel into the radial grooves from the axial grooves. The presence of the floating tabs 142 ensures that the connector 12 is sufficiently seated onto the strut rod 14, such that the power and ground terminals 16, 18 are electrically connected at the intended interfaces, before it can be locked together.

Figure 8:
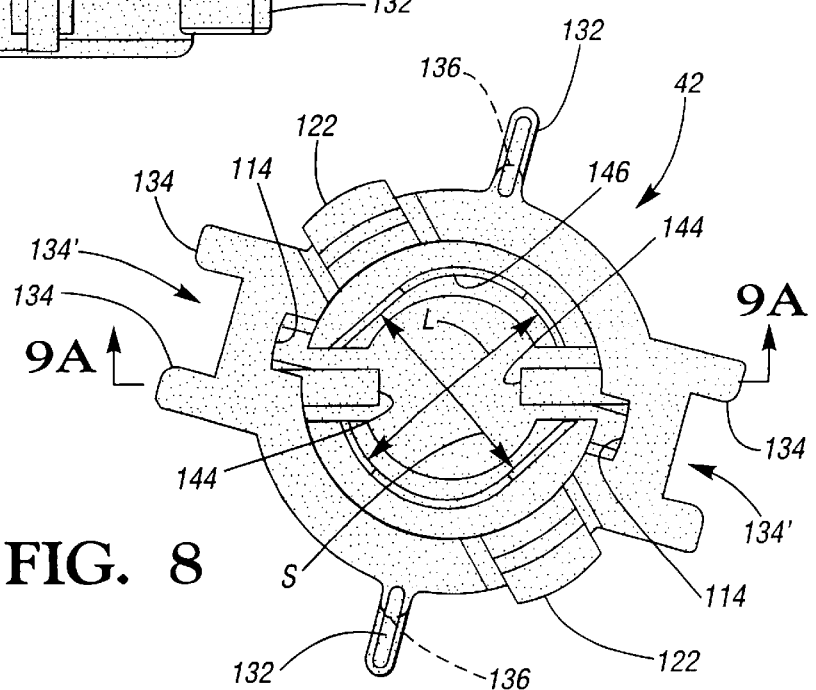
FIG. 8 is a top plan view of the lock ring shown at FIG. 6.
Figures 9A, 9B:
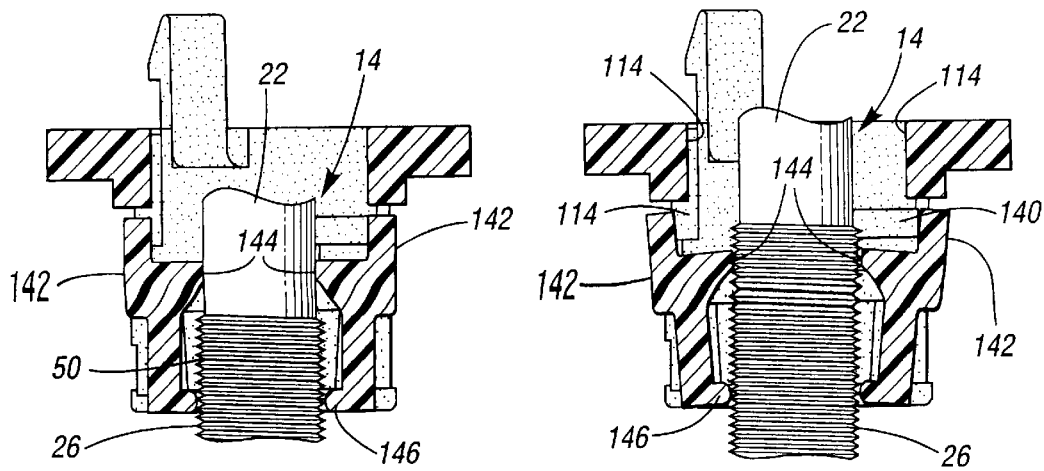
FIG. 9A is a partly sectional view depicting an end portion of a strut rod of the connection system inserted into the lock ring seen along line 9A—9A of FIG. 8, wherein the smooth section of the strut rod is abutting floating tabs of the lock ring.
FIG. 9B is a partly sectional view depicting the end portion of the strut rod inserted into the lock ring similar to FIG. 9A, wherein now the threaded section of the strut rod is abutting floating tabs of the lock ring.
Figure 11:
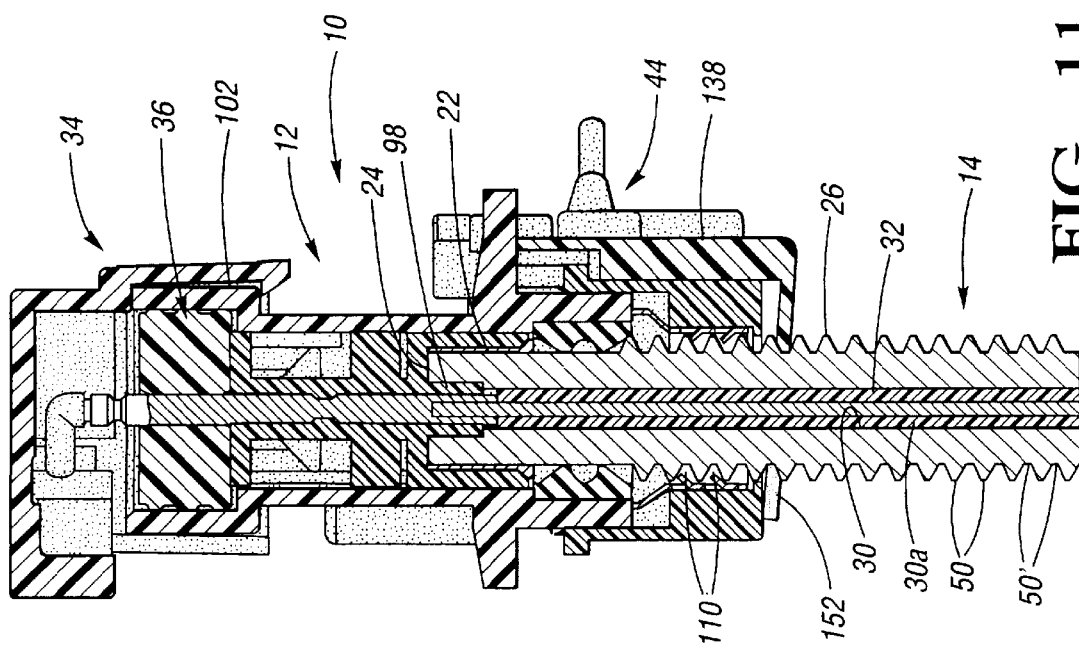
FIG. 11 is a partly sectional side view of the connection system according to the present invention, wherein the lock ring is locked relative to the connector shell and a CPA member thereof has been attached.
Figure 10:
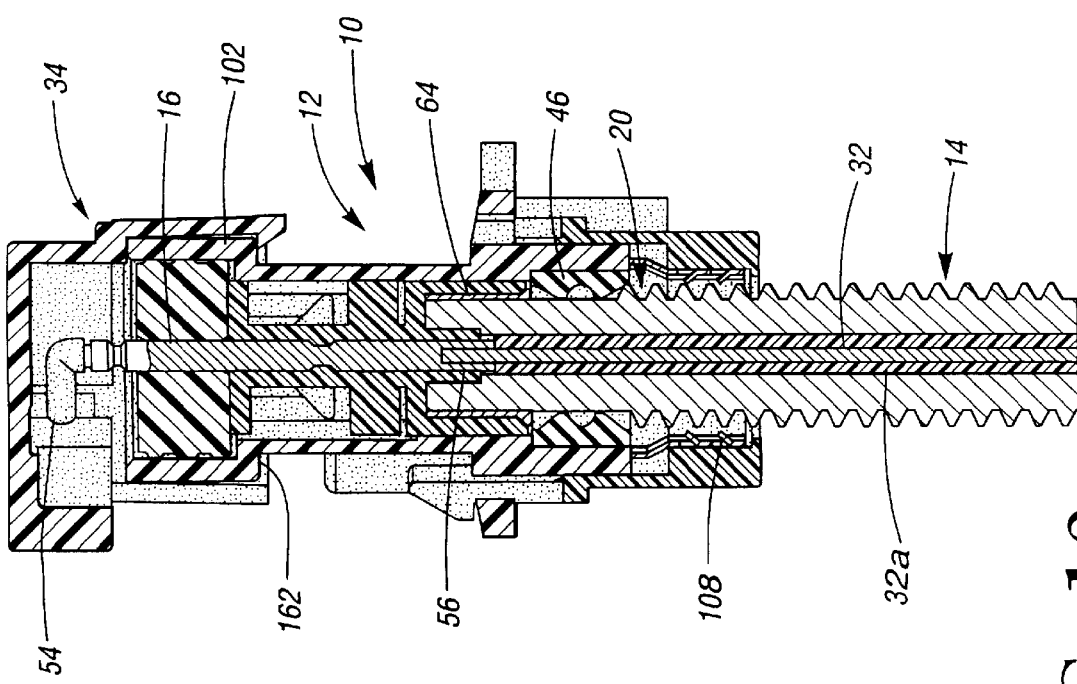
FIG. 10 is a partly sectional side view of the connection system according to the present invention, wherein the lock ring is unlocked relative to the connector shell.

As best shown at FIG. 8, at the bottom end of the lock ring 42, the interior hollow 116 has an offset 146 which is elliptically cross-sectioned. As shown at FIGS. 10 and 11, when the connector shell 40 and lock ring 42 are assembled, the anchor portion 108 of each of the legs 48 is located at the larger elliptical cross-section L, but as the lock ring is rotated relative to the connector shell, the anchor portions become located at the smaller elliptical cross-section S. When at the smaller elliptical cross-section S, the anchor portion 108 is squeezed against the threaded section 26, whereupon the serrations 110 enter into the valleys 50' between the threads 50 so as to be interferingly engaged with threads and thereby anchor the connector 12 to the strut rod 14.

The connector position assurance (CPA) member 44 will be detailed.

As indicated hereinabove, the CPA member 44 has a bifurcated collar 138 of open annular shape, characterized by a collar opening 148. At each side of the collar opening 148 is a snap fitting 150. The aforementioned pedestal 128 is T-shaped and seats between the pairs of connector tabs 126' and pairs of lock ring tabs 134' when these are aligned with each other; ie., when the connector shell 40 and lock ring 44 are locked together by mutual rotation. When the pedestal 128 is so seated, the bifurcated collar 138 abuts connector shell 40 and the lock ring 42, and the snap fittings 150 engage the embossments 136 of the lock ring thereby snap fitting the CPA member 44 onto the lock ring. When seated, the pedestal 128 abuts the connector tabs 126 and the lock ring tabs 134, thereby preventing the lock ring 42 from reverse rotating relative to the connector shell 40, as could otherwise happen due to vibration.

A C-shaped flange 152 is located at the lower end of the CPA member 44, and snaps into a valley 50' between the threads 50 to provide a supplemental mechanical attachment of the connector 12 with the strut rod 14. A loop member 154 radially extends opposite the collar 138. The power and ground cables 54, 62 route through the loop member 154 for easy delivery of the CPA member 44 to a vehicle assembly plant, wherein the CPA member is installed after the connector shell 12 is locked to the strut rod 14.

Referring now additionally to FIG. 12, the wire dress 34 will be detailed.

The wire dress 34 is a plastic fitting which engages the connector shell 40 at the annular shell 102 via three flex lock mechanisms 156 engaging an exterior lip 162 of the annular shell. The wire dress 34 is free to rotate relative to the connector shell 40, so that the strut rod 14 and connector 12 orientations do not affect wire routing of the power and ground cables 54, 62. A lower cable holder 158 is pivotally mounted to the wire dress, and when pivoted serves to hold the power and ground cables between it and a complementing upper cable holder 160.

The wire dress 34 is preferably right angled, and serves to secure the wiring cables and prevent wire chaffing and/or wire fatigue due to vibration.

Operation of the connection system 10 according to the present invention will now be detailed.

After passing through the wire dress, the power cable is crimped onto the power terminal, and thereupon the power terminal is passed through the center opening in the cable seal and passed into the insert until the secondary lock tabs engage the reduced cross-section thereof. After passing through the wire dress and an outboard hole of the cable seal, the ground cable is crimped onto the ground terminal, and thereupon located into the ground terminal slot 88 of the insert 38.

The post is placed into the other outboard hole of the cable seal (the two outboard holes are symmetric with the central hole) as the cable seal is sealably seated into the shell of the connector shell and the insert is mountably received into the interior hollow of the connector shell. The wire dress is now snapped onto the lip of the shell.

With the lock tabs of the lock ring engaged in the lock slots of the connector shell and the bosses of the connector shell in the axial grooves of the lock ring, the end portion of the strut rod is received into the bottom end of the lock ring until the threads of the threaded section pivot the floating tabs out of occlusion of the radial grooves.

At this point, the power terminal is in electrical contact with the pin 32 and the ground terminal is in electrical contact with the smooth section 22. Further at this point, the serrations of the anchor portions of the legs are not engaged with the threads of the threaded section of the strut rod.

Now, the lock ring is rotated relative to the connector shell, wherein the bosses travel along the radial grooves. At the end of travel of the bosses, the pairs of lock ring tabs and connector tabs align. At this point, the serrations of the anchor portions of the legs are interferingly engaged with the threads by action of the offset.

Now, the CPA member is snapped onto the lock ring, wherein the pedestal snugly fits between lock ring tabs and the connector tabs to prevent rotation between the lock ring and the connector shell. In this regard, the C-shaped flange of the CPA member will have seated into a valley of the threads.

To those skilled in the art to which this invention appertains, the above described preferred embodiments may be subject to change or modification. Such change or modification can be carried out without departing from the scope of the invention, which is intended to be limited only by the scope of the appended claims.

We claim:

1. A connector system for connecting a strut rod to a source of electricity comprising:

a strut rod having an end portion, said end portion comprising a distal end, a first electrical contact, and a second electrical contact; and a connector for connecting to said end portion, said connector comprising:

power terminal means for connecting to a source of electricity and for contacting said first electrical contact;

ground terminal means for connecting to the source of electricity and for contacting said second electrical contact;

insert means for supporting said power and ground terminals;

a connector shell having a first interior hollow that supportably receives therein said insert means, said connector shell having an upper end and an opposite lower end;

lock ring means having a second interior hollow for receiving therein said end portion of said strut rod;

connection means for rotatably connecting said lock ring to said connector shell, wherein said lock ring is rotatable relative to said connector shell between an unlocked position and a locked position;

interlock means connected with said connector shell and said lock ring for selectively locking said lock ring onto said connector shell responsive to said lock ring being rotated from said unlocked position to said locked position;

first seal means for sealing said upper end of said connector shell with respect to said power and ground terminal means;

second seal means for sealing said lower end of said connector shell with respect to said end portion of said strut rod; and attachment means for attaching said connector to said end portion of said strut rod responsive to rotation of said lock ring from said unlocked position to said locked position;

wherein when a predetermined portion of said end portion of said strut rod is received into said connector, said power terminal is electrically connected to said first electrical contact and said ground terminal is electrically connected to said second electrical contact.

2. The connecting system of claim 1, further comprising connector assurance means for interfacing with said connector shell and said lock ring only when said lock ring is at said locked position, and, when interfaced with said connector shell and said lock ring, for preventing said lock ring from rotating from said locked position to said unlocked position.

3. The connection system of claim 2, wherein said connector assurance means comprises:
CPA member means having first abutment means;
first abutment pair means connected with said connector shell;
second abutment pair means connected with said lock ring; and
means for selectively retaining said first abutment means interferingly between said first and second abutment pair means when said lock ring is at said locked position.

4. The connection system of claim 1, wherein said interlock means prevents said lock ring from rotating from said unlocked position to said locked position unless said predetermined portion of said end portion of said strut rod is received within said connector.

5. The connection system of claim 4, wherein said interlock means comprises:
a pair of opposed bosses at said lower end of said connector shell;
a pair of opposed axial grooves formed in said lock ring structured to receive therein said pair of bosses;
a pair of radial grooves structured to receive therein said pair of bosses, wherein each radial groove communicates with a respective axial groove; and
interference means for selectively occluding said communication responsive to insertion of said end portion into said connector.

6. The connection system of claim 1, wherein said end portion of said strut rod further comprises:
a smooth section adjacent said distal end, wherein said smooth section comprises said second electrical contact; and
a threaded portion adjoining said smooth section remote from said distal end;
wherein said first electrical contact is axially positioned with respect to said strut rod, and wherein said first electrical contact is accessible to said power terminal means at said distal end.

7. The connection system of claim 6, wherein said attachment means comprises:
leg means axially extending from said lower end of said connector shell for engagingly interfacing with said threaded section in response to being squeezed thereagainst; and
embossment means connected with said lock ring for squeezing said leg means against said threaded section when said lock ring is rotated to said locked position from said unlocked position.

8. The connection system of claim 1, further comprising anti-rotation means for preventing relative rotation between said connector shell and said end portion of said strut rod.

9. The connection system of claim 1, wherein said attachment means comprises:
a pair of lock tabs connected to one of said connector shell and said lock ring; and
an annular flange located at the other of said connector shell and said lock ring, said annular flange having a pair of lock slots for receiving said pair of lock tabs;
wherein said lock tabs are structured to selectively engage said annular flange so as to selectively prevent said lock ring from separating from said connector shell.

10. The connection system of claim 1, further comprising wire dress means located at said upper end of said connector shell for providing a right angled support structure for wiring of the source of electricity.

11. A connector system for connecting a strut rod to a source of electricity comprising:
a strut rod having an end portion, said end portion comprising a distal end, a first electrical contact, and a second electrical contact; and
a connector for connecting to said end portion, said connector comprising:
power terminal means for connecting to a source of electricity and for contacting said first electrical contact;
ground terminal means for connecting to the source of electricity and for contacting said second electrical contact;
insert means for supporting said power and ground terminals;
a connector shell having a first interior hollow that supportably receives therein said insert means, said connector shell having an upper end and an opposite lower end;
lock ring means having a second interior hollow for receiving therein said end portion of said strut rod;
connection means for rotatably connecting said lock ring to said connector shell, wherein said lock ring is rotatable relative to said connector shell between an unlocked position and a locked position;
interlock means connected with said connector shell and said lock ring for selectively locking said lock ring onto said connector shell responsive to said lock ring being rotated from said unlocked position to said locked position;
first seal means for sealing said upper end of said connector shell with respect to said power and ground terminal means;
second seal means for sealing said lower end of said connector shell with respect to said end portion of said strut rod;
attachment means for attaching said connector to said end portion of said strut rod responsive to rotation of said lock ring from said unlocked position to said locked position; and
connector assurance means for interfacing with said connector shell and said lock ring only when said lock ring is at said locked position, and, when interfaced with said connector shell and said lock ring, for preventing said lock ring from rotating from said locked position to said unlocked position;
wherein said interlock means prevents said lock ring from rotating from said unlocked position to said locked position unless a predetermined portion of said end portion of said strut rod is received within said connector;
wherein when a predetermined portion of said end portion of said strut rod is received into said connector, said power terminal is electrically connected to said first electrical contact and said ground terminal is electrically connected to said second electrical contact.

12. The connection system of claim 11, wherein said connector assurance means comprises:
CPA member means having first abutment means;
first abutment pair means connected with said connector shell;

second abutment pair means connected with said lock ring; and means for selectively retaining said first abutment means interferingly between said first and second abutment pair means when said lock ring is at said locked position.

13. The connection system of claim 12, wherein said means for preventing said lock ring from rotating comprises:

a pair of opposed bosses at said lower end of said connector shell;

a pair of opposed axial grooves formed in said lock ring structured to receive therein said pair of bosses;

a pair of radial grooves structured to receive therein said pair of bosses, wherein each radial groove communicates with a respective axial groove; and interference means for selectively occluding said communication responsive to insertion of said end portion into said connector.

14. The connection system of claim 13, wherein said end portion of said strut rod further comprises:

a smooth section adjacent said distal end, wherein said smooth section comprises said second electrical contact; and a threaded portion adjoining said smooth section remote from said distal end;

wherein said first electrical contact is axially positioned with respect to said strut rod, and wherein said first electrical contact is accessible to said power terminal means at said distal end.

15. The connection system of claim 14, wherein said attachment means comprises:

leg means axially extending from said lower end of said connector shell for engagingly interfacing with said threaded section in response to being squeezed thereagainst; and embossment means connected with said lock ring for squeezing said leg means against said threaded section when said lock ring is rotated to said locked position from said unlocked position.

16. The connection system of claim 15, further comprising anti-rotation means for preventing relative rotation between said connector shell and said end portion of said strut rod.

17. The connection system of claim 16, wherein said attachment means comprises:

a pair of lock tabs connected to one of said connector shell and said lock ring; and an annular flange located at the other of said connector shell and said lock ring, said annular flange having a pair of lock slots for receiving said pair of lock tabs;

wherein said lock tabs are structured to selectively engage said annular flange so as to selectively prevent said lock ring from separating from said connector shell.

18. The connection system of claim 17, further comprising wire dress means located at said upper end of said connector shell for providing a right angled support structure for wiring of the source of electricity.

19. The connection system of claim 18, further comprising tab means connected with said connector shell and said lock ring for a user to grasp when rotating said lock ring relative to said connector shell.

* * * * *